D. T. SINGLETON.
Plow

No. 101,056.  Patented March 22, 1870.

Witnesses:
A. W. Almquist
Jno. F. Brooks

Inventor:
D. T. Singleton
per
Mmm
Attorneys.

UNITED STATES PATENT OFFICE.

D. T. SINGLETON, OF EATONTON, GEORGIA.

IMPROVEMENT IN PLOWS.

Specification forming part of Letters Patent No. 101,056, dated March 22, 1870.

*To all whom it may concern:*

Be it known that I, D. T. SINGLETON, of Eatonton, in the county of Putnam and State of Georgia, have invented a new and useful Improvement in Plows; and I do hereby declare that the following is a full, clear, and exact description thereof, which will enable others skilled in the art to make and use the same, reference being had to the accompanying drawings, forming part of this specification, in which—

Figure 1:
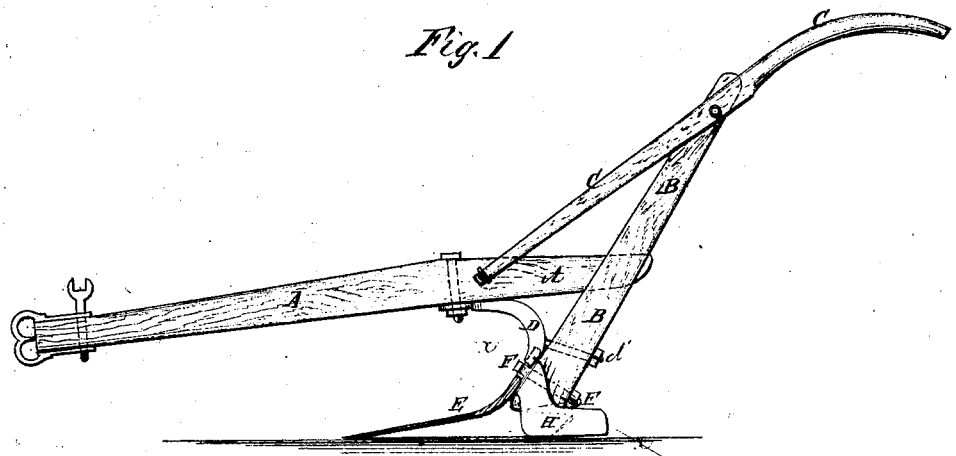
Figure 2:
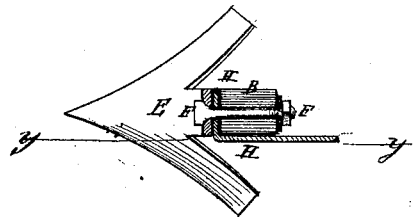
Figure 3:
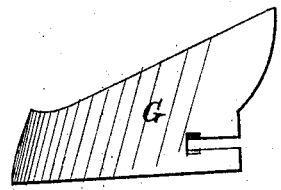
Figure 4:
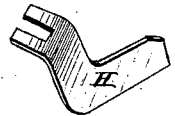

Figure 1 is a side view of my improved plow, partly in section through the line $y\,y$, Fig. 2. Fig. 2 is a detail sectional view of the same, taken through the line $x\,x$, Fig. 1. Fig. 3 represents a turn-shovel plow illustrating a part of my invention. Fig. 4 is a perspective view of the detachable guide-bar.

Similar letters of reference indicate corresponding parts.

My invention has for its object to improve the construction of plows, so as to make them simpler in construction and more convenient in use; and it consists in the construction and combination of various parts of the plow, as hereinafter more fully described.

A is the plow-beam, the rear end of which is securely attached to the standard B.

C are the handles, the lower or forward ends of which are securely attached to the beam A, and the upper parts of which are connected with the upper end of the standard B by a round, in the ordinary manner.

D is a curved or semicircular brace-bar, the upper end of which is securely bolted to the beam A. The lower part of the brace-bar D has a bolt, $d'$, formed upon or attached to it, which passes through the standard B, and is secured in place by a nut screwed upon its rear end.

E is an ordinary plow, which is made in the usual manner, except that its upper part is slotted from its upper edge to fit upon the lower end of the brace-bar D and upon the bolt F, which passes through the standard B and is secured in place by a nut. The lower part or end of the slot in the plow E is countersunk, as shown in Figs. 2 and 3, to fit upon the head of the bolt F to hold the said plow securely in place.

G is a turn-shovel plow, which is secured in place by means of a countersunk slot in the manner hereinbefore described with reference to the plow E.

H is the guide-bar, which is made in about the shape shown in Figs. 1, 2, and 4. The forward end of the guide-bar H is bent to one side; is slotted to receive the bolt F; is slid into a notch or recess formed to receive it upon the forward side of the standard B, and its upper edge passes beneath a shoulder formed upon the lower end of the brace-bar D, so that the said guide-bar is secured in place by tightening the bolt $d'$. The guide-bar H is further secured in place by being clamped between the plow and the standard by tightening the bolt F. When the guide-bar H is used with a turn-shovel plow, as G, its forward edge may be beveled or sharpened to serve as a cutter.

Having thus described my invention, I claim as new and desire to secure by Letters Patent—

The detachable guide-bar H, constructed substantially as herein shown and described, and secured to the standard B by means of the shouldered end of the brace-bar D and the plow, either or both, as and for the purpose set forth.

D. T. SINGLETON.

Witnesses:
J. S. BRIDGES,
MARY CASWELL.